US006542536B1

(12) United States Patent
Hershey et al.

(10) Patent No.: US 6,542,536 B1
(45) Date of Patent: Apr. 1, 2003

(54) SPREAD SPECTRUM COMMUNICATIONS WITH SELECTABLE DATA TRANSFER RATES

(75) Inventors: John Erik Hershey, Ballston Lake, NY (US); John Anderson Fergus Ross, Del Mar, CA (US); Naofal Mohammed Wassel Al-Dhahir, Chatham, NJ (US); Mark Lewis Grabb, Ballston Spa, NY (US); Michael James Hartman, Clifton Park, NY (US); Richard Louis Frey, Delanson, NY (US); John Anthony Esposito, W. Windsor, NJ (US); Roy Marion LaRosa, Madison, NJ (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/441,013

(22) Filed: Nov. 16, 1999

Related U.S. Application Data

(60) Provisional application No. 60/147,365, filed on Aug. 6, 1999.

(51) Int. Cl.[7] ............................ H04B 1/69; H04K 1/00; H04L 27/30
(52) U.S. Cl. ...................................... 375/130
(58) Field of Search ................ 375/130, 140–142, 375/146–147, 150, 367; 370/320, 335, 342, 441, 515

(56) References Cited

PUBLICATIONS

AS Gupta, "A Program To Compute The Coordinates of a Geostationary Satellite For Time and Frequency Broadcast", IEEE Transactions of Instrumentation and Measurement, vol. 42, No. 2, Apr. 1993, pp. 480–489.

VJ Slabinski, "Variations in Range, Range–rate, Progapation Time Delay, and Doppler Shift For A Nearly Geostationary Sattellite", in Communications Satellite Technology, Ed.: PL Bargellini, c 1974 The Massachusetts Institute of Technology, pp. 3–28.

RH Frick, TB Garber, "Perturbations of a Synchronous Satellite", R–339, May 1962, Rand Corp., Santa Monica, California, Sec. III, Table 1, p. 35.

*Primary Examiner*—Jean Corrielus
*Assistant Examiner*—Qutbuddin Ghulamali
(74) *Attorney, Agent, or Firm*—Jean K. Testa; Patrick K. Patnode

(57) ABSTRACT

A spread spectrum communications system that is operable to provide user-selectable data transfer rates comprises a user station for generating an access request and a gateway server for receiving the access request. The gateway server includes a rate unit for comparing a requested rate to assigned rates, a selector for selecting an available user channel and an available signaling alphabet, and an allocation unit for assigning the carrier, user channel, and alphabet to the access request. One of several offered transfer rates is assigned to the available user channel. Each offered rate corresponds to a set of signaling alphabets with low cross-correlation for data transfer.

36 Claims, 8 Drawing Sheets

Fig. 8
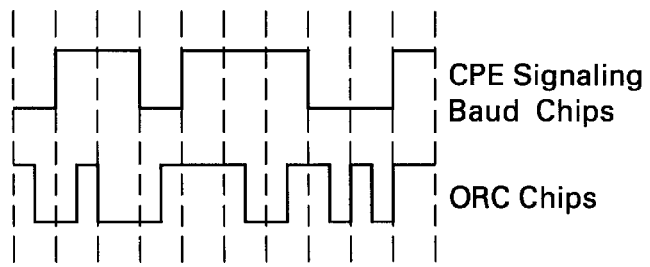
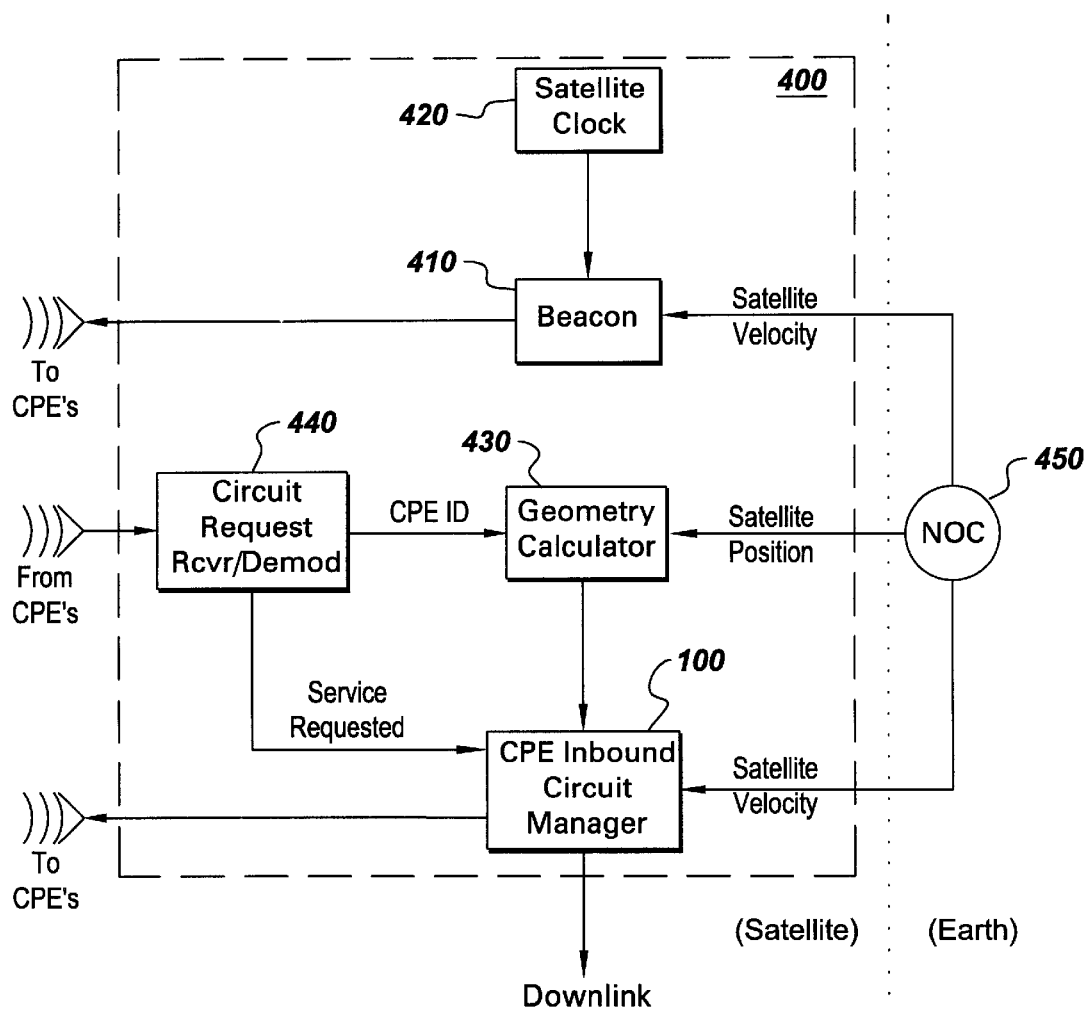
Fig. 9

SPREAD SPECTRUM COMMUNICATIONS WITH SELECTABLE DATA TRANSFER RATES

CROSS REFERENCE TO RELATED APPLICATION

The Application claims the benefit of U.S. Provisional Application No. 60/147,365, filed Aug. 6, 1999.

BACKGROUND OF THE INVENTION

1. Field of the Invention

This invention relates to digital data communications and, more particularly, to a communications system and method for providing spread spectrum data transfer at user-selectable transfer rates. In one embodiment, the invention uses direct sequence spread spectrum (DSSS) signaling.

2. Description of the Related Art

Anticipated data communications needs in industry, government, and educational institutions will require communications systems providing fast, high quality data transfer with substantial user flexibility. Because all communications media (e.g., electromagnetic spectrum allocations) are finite resources, a growing need exists for new technologies that use those resources more efficiently. Promising approaches for more efficient data transmission generally use some method of sharing the medium among multiple users, or multiple access signaling.

Some features desirable for multiple access systems have been realized through the use of time division multiple access (TDMA) signaling methods. TDMA systems allocate transmission capacity among multiple users within a transmission region by dividing transmission time into a series of discrete data frames and assigning to each user a specified time slot in each frame.

Through TDMA, multiple user stations can access a single passband carrier because all stations are precisely synchronized and each transmits only during its preassigned time slots. Many digital cellular telephone systems use TDMA signaling. A multiple access system also typically supports several discrete frequency carriers, each of which occupies a narrow frequency passband of the system's spectrum allocation.

Although TDMA provides effective multiple access, it has several drawbacks relative to satisfying emerging data transmission needs. TDMA signaling with high transmission quality (i.e., low error rates) requires user receivers to perform frequent frame/slot synchronization. This, in turn, reduces signaling capacity and increases the complexity of user and base station equipment.

Timewise allocation of transmission carrier access also limits TDMA user transmitters to low duty cycles, which creates various negative consequences for battery life in mobile units and for transmitter hardware generally. Unintended recipients can easily intercept unencrypted TDMA transmissions. Moreover, time division complicates allocation of unused carrier capacity to users currently accessing the system.

An alternative to TDMA for multiple user access may be provided by spread spectrum techniques such as code division multiple access (CDMA) signaling. Spread spectrum techniques include modulation schemes that generate a transmission signal covering more bandwidth than is required for the message being transmitted. The increased bandwidth depends upon a message-independent spreading technique. Typical spreading techniques modulate the message signal over the transmission band in an unpredictable manner, thereby preventing intelligible reception of the message by other than its intended recipient.

CDMA signaling spreads a baseband data stream by modulating the data stream across the transmission passband (or "frequency carrier") in accordance with a pseudorandom code. A typical CDMA implementation involves direct sequence spread spectrum (DSSS) modulation, in which the message signal is phase modulated directly by a periodic but pseudorandom binary sequence.

DSSS can provide multiple users with simultaneous access to the same frequency carrier if each user modulates with a different spreading code and no two of the codes have significant statistical cross-correlation. Independent message transmissions, spread by such approximately uncorrelated codes, can occupy the same spread-spectrum frequency carrier with insignificant interference between messages. Each transmission occupies the entire carrier, just as in TDMA signaling. Unlike TDMA, however, multiple users of a DSSS system do not pass the carrier access around in accordance with assigned time slots; instead, they all transmit simultaneously.

A DSSS receiver recovers a message signal from the (spread-spectrum) transmission signal by modulating the spread-spectrum signal with the same code used to spread the message signal. The low cross-correlations of the spreading codes ensures that spread-spectrum components associated with other messages will remain spread. This second application of the spreading code will extract (or "despread") the message signal originally modulated with that spreading code.

CDMA offers several significant benefits for data communications generally, including a 100% transmission duty cycle, simple data synchronization, straightforward reprogrammability, and some message privacy. (See Table 1.) DSSS in particular has received considerable interest from some digital cellular service providers for its high spectral efficiency. It has been suggested that this efficiency could potentially increase user capacity by 20–40 times over analog cellular systems.

For cellular applications, CDMA signaling also has drawbacks. Practical cellular service must provide reliable access to subscribed users throughout a designated service area. A cellular service provider does this by dividing the service area into cells and locating a base station at the center of each cell.

User terminals, such as mobile transceivers, typically have only limited transmission ranges due to limited signal strength. The strength of a user terminal's signal received at a base station depends upon the distance between the user terminal and the base station. Cell size thus must be limited so that each mobile unit within the service area always has sufficient signal strength to communicate with at least one base station.

CDMA system performance is also strongly affected by signal attenuation within a given cell. For the present discussion, the phrase "user capacity" of a frequency carrier in a multiple access system means the number of users the system can accommodate, concurrently, on the frequency carrier. User capacity typically depends primarily upon the width of the carrier passband. For CDMA systems, user capacity also varies inversely with the data rate, the bit error rate of the recovered signal (expressed in terms of the signal to noise ratio, or SNR), and the power of the received signal.

Assured access and acceptable bit error rate requirements demand that a CDMA cellular system trade off data rate for signal power. That is, a user relatively distant, or remote, from the nearest base station must communicate at a lower data rate than another user located near the base station. This trade off works in practice, but the low data rates required for remote locations (e.g., adjacent cell boundaries) can noticeably degrade voice quality.

Emerging data transfer applications increasingly require more flexible and efficient communications systems that provide high data capacity and on-demand access. Current CDMA communications architectures do not offer these features. Present systems prevent active users from accessing the systems' unused data transfer capacity; instead, they allocate high data rates to some users whose needs could be met with lower rates, while limiting other users, who need substantial data transfer capacity, to undesirably low data rates.

SUMMARY OF THE INVENTION

In current CDMA communications systems, there is an unmet need for a practical, multiple access architecture that realizes the potential spectral efficiency offered by CDMA signaling. Such architecture should provide multiple users with flexible access to unused data transfer capacity and should enable them to select data transfer rates in accordance with their needs.

The invention constitutes a spread spectrum communications apparatus comprising an m-sequence generation unit, a symbol generation unit, and a code modulation unit. The m-sequence generation unit receives a phase assignment signal, indicating an assigned phase of a predetermined m-sequence, and generates a sequence signal representing the assigned phase of the m-sequence.

The symbol generation unit generates, in accordance with the sequence signal, a coding signal representing a basic symbol of an assigned signaling alphabet. The assigned signaling alphabet is selected from a predetermined number of signaling alphabets comprising respective basic symbols constructed from the assigned phase. The predetermined number of signaling alphabets have low cross-correlation therebetween and provide spread spectrum data transfer at an assigned transfer rate selected from a plurality of offered transfer rates. The code modulation unit applies the coding signal to an incoming first signal to generate an outgoing second signal.

The invention also constitutes a spread spectrum communications method comprising the steps of generating a sequence signal, generating a coding signal in accordance with the sequence signal, and generating an outgoing signal. The sequence signal represents an assigned phase of a predetermined m-sequence. The coding signal represents a basic symbol of an assigned signaling alphabet, the assigned signaling alphabet being selected from a predetermined number of signaling alphabets comprising respective basic symbols constructed from the assigned phase.

The predetermined number of signaling alphabets have low cross-correlation therebetween and provide spread spectrum data transfer at an assigned transfer rate selected from a plurality of offered transfer rates. The outgoing signal is generated in accordance with the coding signal and an incoming signal.

BRIEF DESCRIPTION OF THE DRAWINGS

FIG. 8 is a timing diagram of the overlay reference channel compared a to CPE (customer premises equipment) data transfer channel in a preferred embodiment of the present invention;

FIG. 9 is a block diagram of an uplink inbound receiver included in the satellite of the preferred embodiment shown in FIG. 2;

DETAILED DESCRIPTION OF THE PREFERRED EMBODIMENTS

The invention is hereinafter discussed in the specific context of a satellite system for providing multiple access communications through a Ka-band microwave satellite in geostationary Earth orbit. The invention also encompasses systems using Low Earth Orbit (LEO) and Medium Earth Orbit (MEO) satellites, microwave satellites using bands other than the Ka band, and systems using other broadband-unguided media (e.g., other segments of the electromagnetic spectrum), as well as systems using broadband guided media.

Figures 1, 2:
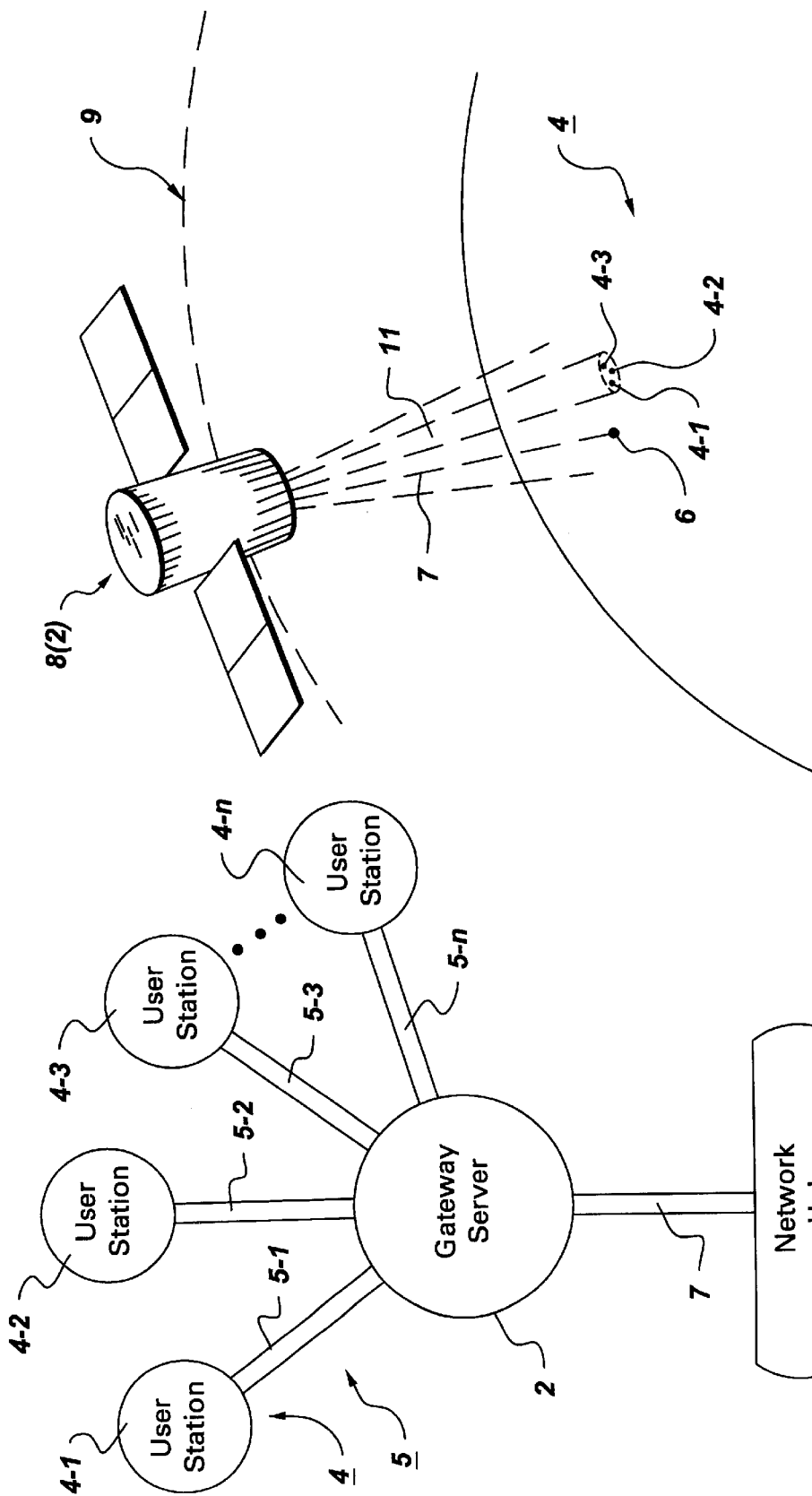
FIG. 1 schematically illustrates a satellite communications system embodying the CDMA architecture of the present invention.
FIG. 2 schematically illustrates a preferred embodiment of the present invention, in which the gateway server of FIG. 1 is included in a Ka band satellite disposed in a geostationary Earth orbit.

FIG. 1 illustrates a spread spectrum communications system embodying the present invention. Generically, the system includes a gateway server 2 that provides one or more user stations 4-1, 4-2, . . . , 4-n, with corresponding broadband multiple access communications links 5-1, 5-2, . . . , 5-n, respectively. Gateway server 2 receives data transfer transmissions over links 5-1, 5-2, . . . , 5-n, demodulates the transmissions, and sends them to a network hub 6 by multiplexing them onto a wideband downlink 7.

In a preferred embodiment, shown in FIG. 2, a Ka-band satellite 8 is disposed in a geostationary Earth orbit 9. Gateway server 2 is included in satellite 8. User stations are embodied as customer premises equipment stations (CPEs), which in the typical case are ground-based stations at fixed locations.

Satellite 8 is constructed to handle traffic at different rates, respectively, from several different user stations (CPEs). In a typical embodiment, a group of CPEs, such as CPEs 4-1, 4-2, and 4-3, are geographically dispersed within a spot beam 11 of satellite 8. A typical spot beam 11 covers, for example, an approximate circle of diameter 350 miles at ground level. Only CPEs 4-1, 4-2, and 4-3 are shown within spot beam 11, for convenience of illustration, but this is not intended to limit the invention. In an actual implementation, the number of CPEs within spot beam 11 may be three or fewer or more than three.

The invention provides efficient utilization of the large data handling capacity made available by high capacity transmission media. These media include broadband spectrum allocations in unguided media, as well as similar resources provided by relevant guided media (fiber optic, cable, etc.). The following description specifically addresses the Ka-band microwave spectrum allocation, but is not intended to be limited to microwave transmissions or even to unguided transmissions. The disclosed architecture achieves this efficiency while also enabling the system's transmission capacity to be flexibly allocated through user-selectable data transfer rates.

Gateway server 2 supports user-gateway links 5-1, 5-2, . . . , 5-n (FIG. 1) based on CDMA signaling. CDMA communications are typically implemented through DSSS coding techniques. Frequency hopping (FH), an alternative spread spectrum technique, can also be implemented using pseudorandom sequence codes similar to the codes used in DSSS.

Implementation of FH methods normally requires fast-settling frequency synthesizers, which increase modem hardware costs. FH nevertheless constitutes a technically feasible alternative to DSSS for implementing the user-gateway links. The invention, therefore, includes embodiments realized with frequency hopping methods.

CDMA has many advantages that benefit different parts of the communications system. Table 1 summarizes some of these advantages from the standpoint of user stations and from the standpoint of a gateway server.

TABLE 1

Advantages of CDMA for the CPE to Satellite Link

| ADVANTAGES TO USER STATION SEGMENT (CPE) | ADVANTAGES TO GATEWAY SERVER SEGMENT (Satellite) |
| --- | --- |
| Transmission Duty Cycle = 100% | Soft Information Easy to Derive for More Efficient FEC (Forward Error Correction) & Power Control |
| Data Synchronization Very Simple | Inherent Fraud Protection |
| Potential RFI Problems Mitigated | Potential of Fewer Problems if Modem Malfunctions |
| Ease of Reprogrammability | Ease of Reprogrammability |

A classic, and perhaps most significant, technical issue with DSSS is synchronization. Another significant issue is power control. The architecture of the invention provides solutions for both of these traditional concerns.

In a preferred embodiment, the spread spectrum architecture disclosed herein has several notable features. The system utilizes a particular signaling format for links between user stations and the gateway server. In a satellite communications embodiment of the invention, such as shown in FIGS. 1 and 2, a customer premises station, such as CPE 4-1, establishes a link 5-1 as an inbound uplink to a satellite 8. CPE 4-1 transfers data over link 5-1 to satellite 8, for relay to a network hub 6, by multiple-access signaling in accordance with the signaling format. In this embodiment, gateway server 2 includes an uplink signal processor, or modem, that demodulates inbound uplink traffic from CPEs 4 and relays the traffic to network hub 6.

The invention also employs, in a preferred embodiment, an Overlay Reference Channel (ORC) received by each user station 4-1–4-n. Among other benefits, the ORC assists each user station 4 in synchronizing its multiple-access transmissions in accordance with its assigned spreading code.

The signaling format of the present system affords flexible and efficient allocation of broadband data transmission capacity by allowing users of the system to select from a range of different data transfer rates. The format advantageously defines multiple data rates in terms of convenient multiples of a basic such data rate. For example, if a Ka-band satellite system embodying the invention offers service at the four data transfer rates of 48 kilobits per second (kbps), 96 kbps, 192 kbps, and 384 kbps, then the basic rate is 48 kbps, and the other rates are all (simple) multiples thereof.

A basic signaling format comprises, for example, spread-spectrum quaternary phase shift keying (QPSK) allowing 2 bits per symbol. In a typical case, the system also applies a forward error correction (FEC) code having the undesired, but unavoidable, result of decreasing the effective signaling rate. In the present example, it is assumed (conservatively) that the FEC code results in a rate one-half case (i.e., the effective rate is half the theoretical rate without the FEC code). Thus, the maximum data transfer rate on either the I or the Q channel is 384 kbps.

The communications system achieves flexible, efficient capacity allocation by allowing data transfer at different rates on different frequency carriers and by enabling data transfer at different rates on the same carrier. For example, if user station 4-1 needs to transfer data over the system, it sends an access request to gateway server 2 (FIG. 1) and indicates therein a desired transfer rate from among the rates offered. In a preferred embodiment, as illustrated in FIG. 2, a user station (CPE) signals access requests to satellite 8 on a random access request channel.

Each of the communications system carriers includes one or more user channels that can have different assigned data transfer rates. In response to the access request, gateway server 2 selects a carrier having a user channel with "available capacity" and an assigned transfer rate equal to the requested transfer rate. Here "available capacity" means that the user channel can accommodate access by at least one more user at the assigned transfer rate.

The communications system uses one or more frequency carriers to provide data transfer services. For each carrier, the system can provide such service to multiple users while flexibly allocating the capacity of the carrier to transfer information and allowing user selection of data transfer rates. The system achieves this capability through suitable construction of the spreading codes used by each respective user.

As noted above, achieving effective CDMA communications over a given carrier requires different multiple-access users to signal with approximately uncorrelated spreading codes. Such codes can be constructed using so-called pseudorandom binary sequences (also known as pseudonoise, or "PN," sequences). The application of PN sequences in data transfer contexts is described at length in, for example, chapters 8 and 11 of J. E. Hershey & R. K. Rao Yarlagadda, *Data Transportation and Protection* (1986).

In general, a PN sequence is a stream of binary digits that repeats itself with a fixed period, but for which the individual bits within a given period can be considered to be uncorrelated. In a preferred embodiment, the invention uses spreading codes constructed from sequences in a special class of PN sequences, called maximal-length linearly generated binary sequences, or m-sequences. The invention uses the advantageous properties of m-sequences to provide CDMA services having enhanced flexibility and efficiency.

Spread spectrum signaling codes can be constructed from a PN sequence that is not an m-sequence. However, dense packing of the frequency carrier can be achieved with particular convenience if the sequence is an m-sequence, as explained below.

Figure 3:
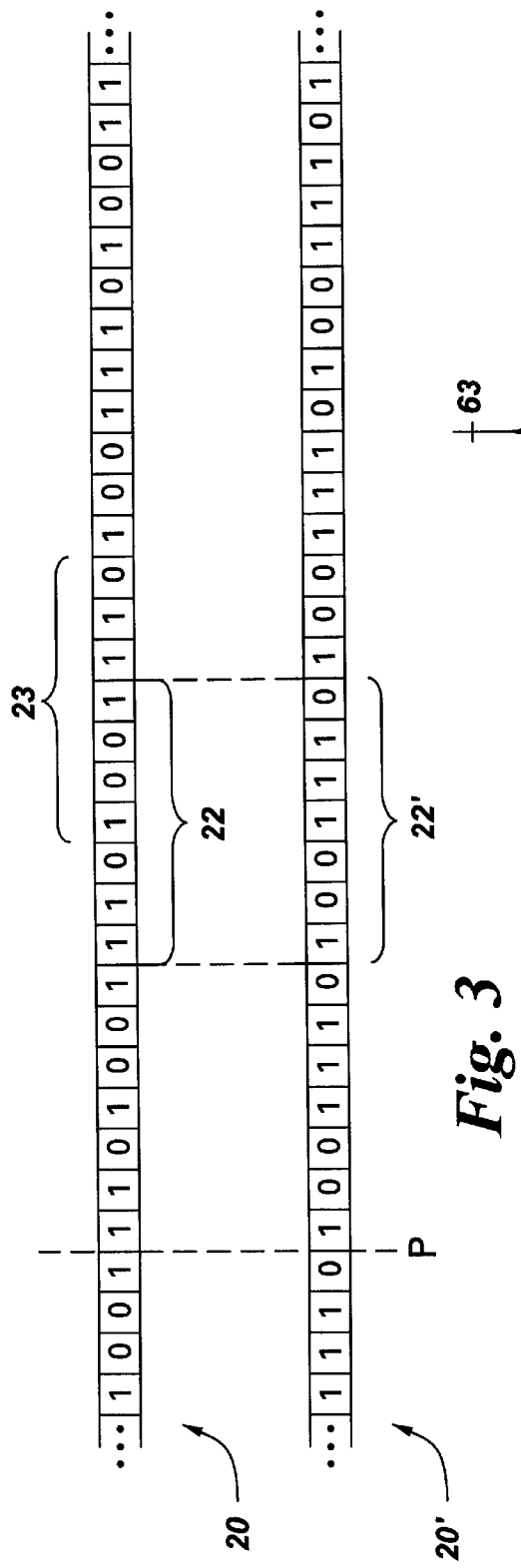
FIG. 3 schematically illustrates phase distinctness for m-sequences as utilized in the present invention.

FIG. 3 illustrates an exemplary m-sequence 20 having a seven-digit period. Every m-sequence, such as sequence 20, repeats itself over a period of $2^n-1$ digits, for some positive integer n. For sequence 20, n=3 because the period of sequence 20 is 7 (=8−1). Every distinct segment of $2^n-1$ digits repeats itself throughout the sequence. Moreover, because the digits within such segment are approximately uncorrelated with each other, sequence 20 possesses seven such distinct segments.

The distinct, repeating, period-length segments of an m-sequence are called "phases." For example, in sequence 20 the specified seven-digit segment 22, having the pattern of digits 1101001, is a phase of sequence 20. The seven-digit segment 23 is another phase of sequence 20. The pattern 1001110 of phase 23 repeats the pattern 1101001 of phase 22, but the first three digits of phase 22 occur as the last three digits of phase 23. Because the digits within each period-length segment of sequence 20 are approximately uncorrelated, however, any two distinct phases will be approximately uncorrelated with each other.

Sequence 20' is a copy of sequence 20 but shifted to the left by three digits. When sequence 20' aligns with sequence 20 (relative to an arbitrary reference position P), it can be seen that sequence 20' corresponds to phase 23 of sequence 20. In particular, phase 22' of sequence 20' aligns with phase 22 of sequence 20 but is identical to phase 23 of sequence 20. The bit streams of sequences 20 and 20', if transmitted with the alignment shown, will therefore be approximately uncorrelated.

Figure 4:
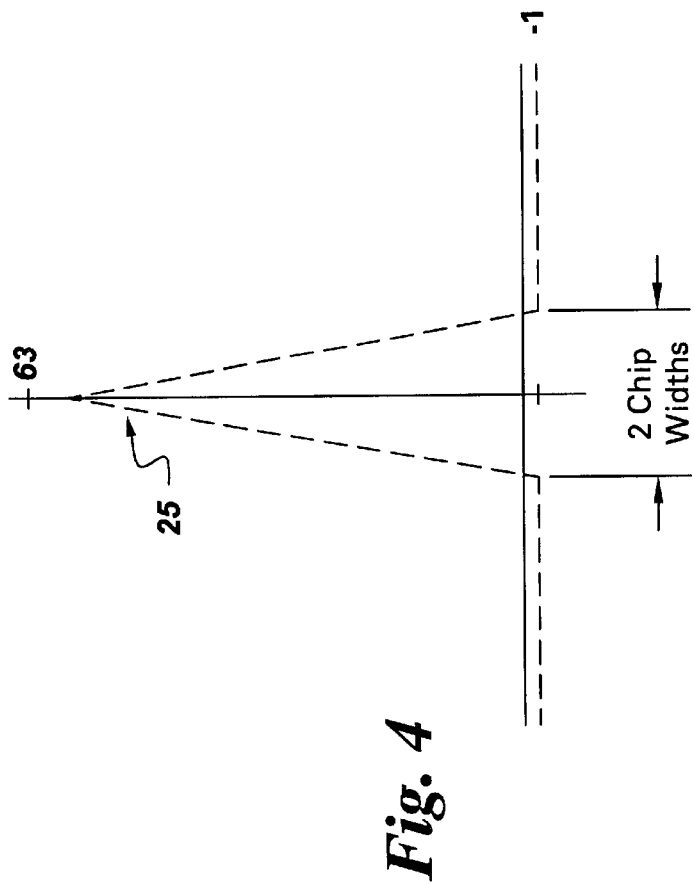
FIG. 4 graphically illustrates the autocorrelation of a 63-chip m-sequence.

FIG. 4 illustrates the autocorrelation of an exemplary m-sequence having a period of 63 digits. M-sequences in general have similarly well-defined autocorrelation of distinct phases. This autocorrelation property makes m-sequences particularly attractive as bases from which to construct spreading codes. Moreover, m-sequences have certain matrix transformation properties with potential value for spread spectrum communications.

In a preferred embodiment, the invention employs both of these aspects of m-sequences to advantage, using the first aspect, low cross-correlation between phases, to divide the capacity of a frequency carrier into several "user channels." Generally, multiple user signals simultaneously transmitted on a single carrier will interfere with each other. But the autocorrelation feature of m-sequences means that signals modulated in accordance with distinct phases of an m-sequence (and from perfectly aligned positions) will not interfere significantly.

The pronounced, narrow autocorrelation peak 25 in FIG. 4 indicates that a signal modulated in accordance with one phase of the sequence will have a high signal-to-noise ratio relative to noise from other phases. Thus, user stations can share the same carrier, without significant interference, if they use respective spreading codes corresponding to different phases of the same m-sequence.

In an exemplary case of the system of FIG. 2, the signaling format uses an m-sequence with a 63-digit period. The user channels of the carrier are defined by identifying, for each one, a distinct phase of the m-sequence. A user transmits on a given user channel by signaling in accordance with the m-sequence phase that defines the user channel. Each user channel has a maximum data transfer rate determined, as noted above, by the effective signaling rate. For example, a satellite system embodiment as outlined above, with a basic signaling format allowing data transfer at 384 kbps, provides data transfer at a maximum rate of 384 kbps on each of the user channels of the carrier.

For example, in a preferred, Ka-band satellite embodiment, the carriers are modulated at a chip rate (i.e., a basic modulation rate) of 24.192 megachips per second. Also, the sequence period has a length of 63 digits. These format parameters, assuming the same m-sequence is used for both the in-phase I and quadrature phase Q channels of the QPSK signaling, also imply an upper bound on the bandwidth required by the carrier: 768 kHz for each digit in the 63-digit period, or 48.384 MHz. The signaling rate, 24.192 megachips per second in this example, remains constant.

The carrier can theoretically be divided into as many user channels as the number of distinct phases of the m-sequence. Thus, with the example m-sequence having a 63-digit period, the carrier can be divided into 63 distinct user channels. In practice, however, this phase saturation of the carrier may not be desirable because the small cross-correlations may cause a debilitating increase in noise. Moreover, in view of the additional coding enhancements the invention provides, phase saturation would likely not be needed.

The invention achieves a first level of multiple access as follows. User stations 4-1 and 4-2 (FIGS. 1 and 2) can share the carrier, but avoid significant interference between their signals, by transmitting on different user channels. To do this requires them to satisfy two conditions: first, user station 4-1 signals with a phase M1 of the sequence and user station 4-2 signals with another phase M2. Second, both of their transmissions must be suitably synchronized. The combination of synchronization and distinct phases ensures that their transmissions will not be significantly cross-correlated.

A preferred embodiment of the invention provides further efficiency and flexibility by allowing multiple users to share, in common, each user channel of the carrier. All users sharing a common user channel can transfer data simultaneously, just as users signaling on different user channels of the same carrier. However, when users share a common user channel, the user channel operates at a lower transfer rate for each user. Thus, the invention allows the "user capacity" of a common, or shared, user channel (i.e., the number of concurrent users that can be accommodated on a common, or shared, user channel) to be enhanced by reducing the data transfer rate.

The invention provides shared access to a common user channel by providing, for each common, or shared, user channel, a set of signaling alphabets for spread spectrum coding on the common user channel. Each signaling alphabet consists of a basic symbol, constructed from the m-sequence phase assigned to the user channel, and the binary complement of the basic symbol. The basic symbol is "constructed" by concatenating a string of repetitions of the user channel phase and of the binary complement of the phase.

For a given set of alphabets, the basic symbol of each alphabet has a distinct pattern of occurrences of the user channel phase. Here, "occurrence" means a repetition of either the phase or the complement of the phase. The basic symbol pattern for each alphabet is designed to provide low cross-correlation with respect to the other alphabets of the set, as will be explained below.

All symbols for a given set of alphabets have the same number of occurrences. The number of occurrences determines both the user capacity of the user channel and the transfer rate. A set of signaling alphabets providing the maximum signaling rate consists of a single alphabet, with the basic symbol of the alphabet consisting of only a single occurrence of the phase for the channel. A set of signaling alphabets providing a transfer rate of one half the maximum consists of two alphabets, with the basic symbol for each alphabet consisting of two occurrences.

In a preferred embodiment, for example, the m-sequence has a 63-digit period and each user channel has a maximum data transfer rate of 384 kbps. For an assigned transfer rate of 48 kbps, for example, the user channel can provide multiple access to as many as eight users concurrently. The set of signaling alphabets corresponding to this one-eighth rate includes eight distinct alphabets, with the basic symbol for each such alphabet comprising eight occurrences in a distinct pattern. A set of signaling alphabets for a rate of 96 kbps similarly consists of four distinct alphabets with respective basic symbols comprising four occurrences each.

All of the basic symbols of a given set of signaling alphabets consist of occurrences of the same m-sequence phase, to ensure the desired correlation properties. Moreover, each user channel of a given carrier has corresponding basic symbols that consist of occurrences of respective phases of the m-sequence selected for the carrier. Typically the system will use a single m-sequence for the alphabets of all of its carriers. In an alternative case, the system uses different m-sequences for different carriers.

Figure 5:
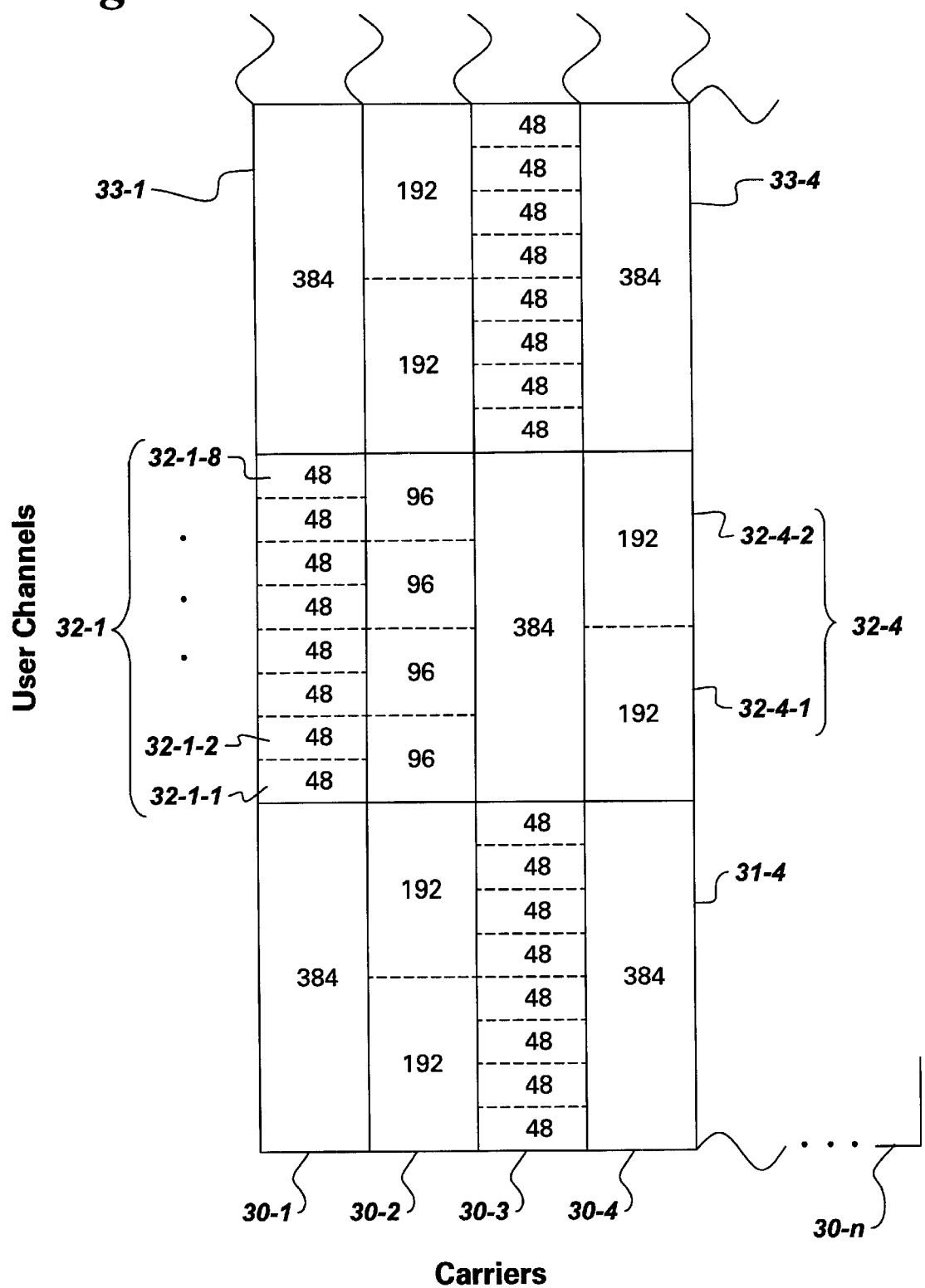
FIG. 5 is a tiling diagram of frequency carriers and transfer rate assignments to user channels of each carrier, in accordance with the present invention.

FIG. 5 diagrams the assignment of different data transfer rates to several frequency carriers 30 in accordance with the invention. Carriers 30-1, 30-2, 30-3, and 30-4 extend vertically in the figure. The wavy lines at the right edge of the figure indicate that more carriers 30 may be included; alternatively, there may be three or fewer carriers 30.

Each of carriers 30 is divided in the vertical dimension into a number of user channels, such as user channels 31-1, 32-1, and 33-1 for carrier 30-1 and user channels 31-4, 32-4, and 33-4 for carrier 30-4. Each such user channel corresponds to a distinct phase of the m-sequence selected for spread spectrum coding on the respective carrier. The wavy lines at the top of the figure indicate that each of carriers 30 may include (by assignment of distinct phases) other user channels in addition to those shown. Alternatively, the system can divide a given carrier into only one or two user channels.

For purposes of illustration, each user channel in FIG. 5 appears as a disjoint segment of its respective carrier. This separation represents the separation of the user channels in accordance with distinct phases of the carrier's m-sequence. Of course, as noted above, spread spectrum coding in accordance with the present invention allows several user signals to occupy the entire carrier simultaneously.

FIG. 5 shows that the present invention also allows plural users to share a given user channel. In the example illustrated, the user channels of carriers 30-1, 30-2, and 30-3 all have the same maximum data transfer rate of 384 kbps. The present invention enables this maximum transfer rate to be distributed among plural simultaneous users in a flexible and efficient manner.

For example, user channel 32-1 includes eight sections 32-1-1, 32-1-2, . . . , 32-1-8 that provide a user capacity of eight for user channel 32-1. The communications system provides a set of signaling alphabets, each constructed from the m-sequence phase assigned to user channel 32-1, for spread spectrum signaling on user channel 32-1. Each of these signaling alphabets includes a basic symbol consisting of eight occurrences of the phase assigned to carrier 30-1. This set of signaling alphabets allows as many as eight users to access user channel 32-1 simultaneously and without significant interference between them. Division into eight such sections limits users of user channel 32-1 to a data transfer rate of 48 kbps.

User channel 31-1 is not divided into sections in this example, which reflects the fact that user channel 31-1 has an assigned transfer rate of 384 kbps and can accommodate only one user at that rate. The set of signaling alphabets corresponding to user channel 31-1 consists of a single signaling alphabet, made up of a basic symbol and its binary complement. Here the basic symbol consists of on e repetition of the phase of carrier 30-1.

User channel 33-1, also having an assigned transfer rate of 384 kbps, has a similar set of signaling alphabets consisting of one alphabet. The basic symbol of the alphabet of user channel 33-1 consists of a single repetition of the phase of user channel 33-1. As indicated above, user channels 31-1, 32-1, and 33-1 will have assigned thereto distinct phases of the same m-sequence, to ensure low cross-correlations o f multiple access signals transmitted thereon. Similarly, user channel 32-4 consists of two sections 32-4-1 and 32-4-2 that reflect an assigned transfer rate of 192 kbps. User channel 32-4 has a set of two signaling alphabets, with the basic symbol of each alphabet consisting of two occurrences of the phase assigned to user channel 32-4.

In one embodiment of the invention, all of carriers 30-1 through 30-4 use the same m-sequence. In this case, the system permits two user channels from different carriers to have assigned thereto the same phase of the m-sequence. One optional configuration thus has user channels 31-1 and 31-4 with the same phase of the m-sequence assigned thereto and with identical Corresponding sets of signaling alphabets (each consisting of a single signaling alphabet).

In the example, user station 4-1 receives (FIGS. 1 and 2) from gateway server 2 a carrier and user channel assignment, such as carrier 30-1 and user channel 32-1. Gateway server 2 also assigns to the access request a signaling alphabet selected from the set of signaling alphabets corresponding to user channel 32-1 and not assigned to another access request. User station 4-1 then uses the assigned signaling alphabet to modulate a baseband data stream onto user channel 32-1 (of carrier 30-1), thus accomplishing transfer of the data at the desired transfer rate.

In a preferred embodiment, gateway server 2 dynamically reassigns data transfer rates to various user channels of a carrier in accordance with changing user demand. For example, user station 4-1 will eventually complete its transmission of data over user channel 32-1 and will indicate the same, t hereby relinquishing the channel and carrier back to the system.

Typically, gateway server 2 will have assigned user channel 32-1 to other users for transmissions concurrently with the data transfer of user station 4-1. If all of these other users have already relinquished their respective accesses to the channel, then, upon relinquishment of the user channel by user station 4-1, gateway server 2 can remove the transfer rate assignment (here, 48 kbps) from user channel 32-1.

If gateway server 2 thereafter receives another access request indicating another requested transfer rate, such as 96 kbps, then gateway server 2 can give user channel 32-1 a new assigned transfer rate of 96 kbps. Assignment of a new set of signaling alphabets will accompany the new rate assignment. In this case, for the assigned rate of 96 kbps, the new set of signaling alphabets will consist of four distinct alphabets and provide the user channel with a user capacity of four. Upon assignment of the new rate to user channel 32-1, gateway server 2 will assign, to this access request carrier 30-1, user channel 32-1, and a selected alphabet from the new set of signaling alphabets.

Each user channel with an assigned signaling rate therefore has an accompanying set of signaling alphabets, with each alphabet of the set including a distinct basic symbol. Several user stations 4 can access the same carrier and the same user channel simultaneously, with insignificant interference, if the signaling alphabets are constructed to have low cross-correlation.

A preferred embodiment of the invention comprises gateway server 2, configured aboard Ka-band satellite 8 and user stations 4, configured as CPEs. In this embodiment, all user stations 4 are adequately synchronized with respect to their individual signals arriving at satellite 8. In addition, all of the user stations 4 signal at the same chip rate (for example, 24.192 megachips per second), irrespective of the transfer rate each selects (i.e., the system incorporates signaling commonality).

The fact that modulating with distinct phases of an m-sequence will prevent significant interference underscores the need for good synchronization. Signaling commonality, on the other hand, provides the advantage of allowing hardware commonality. Hardware commonality can be realized in, for example, clocking components and spectral conditioning (e.g., filtering) equipment. Commonality of hardware has the desirable effect, among others, of reducing the cost of modems used with the system.

The invention achieves the desired signaling commonality while also providing flexible allocation of system capacity through user-selectable data transfer rates. These features are realized through suitable construction of the sets of signaling alphabets assigned to the various user channels of each given carrier. The construction begins with selection of an m-sequence for the carrier, such as the m-sequence with a 63-digit period from the above example.

Each user channel of the carrier is assigned a different phase of the sequence. For the example presented, the assigned phase is a string of 63 binary digits which, for convenience, will be denoted by M. Table 2 specifies, in terms of M, the basic symbols for the set of signaling alphabets corresponding to each of the offered transfer rates 48, 96, 192, and 384 kbps. In Table 2, M denotes the binary complement of M. The basic symbols, as shown, are used to signal a zero of the baseband data stream; the complement of the basic symbol is used to signal a one.

TABLE 2

| Data Transfer Rate (kbps) | User Capacity for the User Channel | Assigned Set of Signaling Alphabets (Basic Symbol Shown) |
|---|---|---|
| 384 | 1 | M |
| 192 | 2 | MM |
|  |  | MM̄ |
| 96 | 4 | MMMM |
|  |  | MMM̄M̄ |
|  |  | MM̄MM̄ |
|  |  | MM̄M̄M |

TABLE 2-continued

| Data Transfer Rate (kbps) | User Capacity for the User Channel | Assigned Set of Signaling Alphabets (Basic Symbol Shown) |
|---|---|---|
| 48 | 8 | MMMMMMMM |
|  |  | MM̄MMM̄MMM̄ |
|  |  | MMM̄M̄MMM̄M̄ |
|  |  | MM̄M̄MMM̄M̄M |
|  |  | MMMMM̄M̄M̄M̄ |
|  |  | MM̄MM̄M̄MM̄M |
|  |  | MMM̄M̄M̄M̄MM |
|  |  | MM̄M̄MM̄MMM̄ |

The signaling structure provided by Table 2 corresponds to a Sylvester-constructed Hadamard set. Thus, for each given transfer rate, the set of basic symbols shown correspond to the respective rows of a Sylvester-Hadamard matrix. The rank of the matrix is equal to the user capacity for that transfer rate (i.e., a power of 2), and +1 in the matrix corresponds to M while −1 correspondss to M̄.

This construction is not limited to a maximum transfer rate of 384 kbps, a basic rate of 48 kbps, or four offered transfer rates (and corresponding user capacities). Indeed, a carrier having a maximum transfer rate of 512 kbps over each user channel might have offered transfer rates of, for example, 32, 64, 128, 256, and 512 kbps. The same construction would provide the basic symbols for the respective sets of signaling alphabets of all the transfer rates except for the basic rate of 32 kbps. For the 32 kbps rate, in this situation, the basic symbols are given by the Sylvester-Hadamard matrix of rank 16.

The Sylvester-Hadamard construction of Table 2 allows for relatively dense packing of the signaling space and enables the system to operate at a signaling rate constant over all offered transfer rates. The application of Hadamard matrices to communications and signal processing is well known in the art. These uses are summarized in, for example, R. K. Yarlagadda & J. E. Hershey, *Hadamard Matrix Analysis and Synthesis: With Applications to Communications and Signal/Image Processing* (1997).

The structure exemplified in Table 2 may use a constant signal-to-noise ratio, $E_b/N_o$, over all waveforms (i.e., at all of the offered transfer rates). Alternatively, the $E_b/N_o$ may be assigned in an inverse relation to the data transfer rate.

Figure 6:
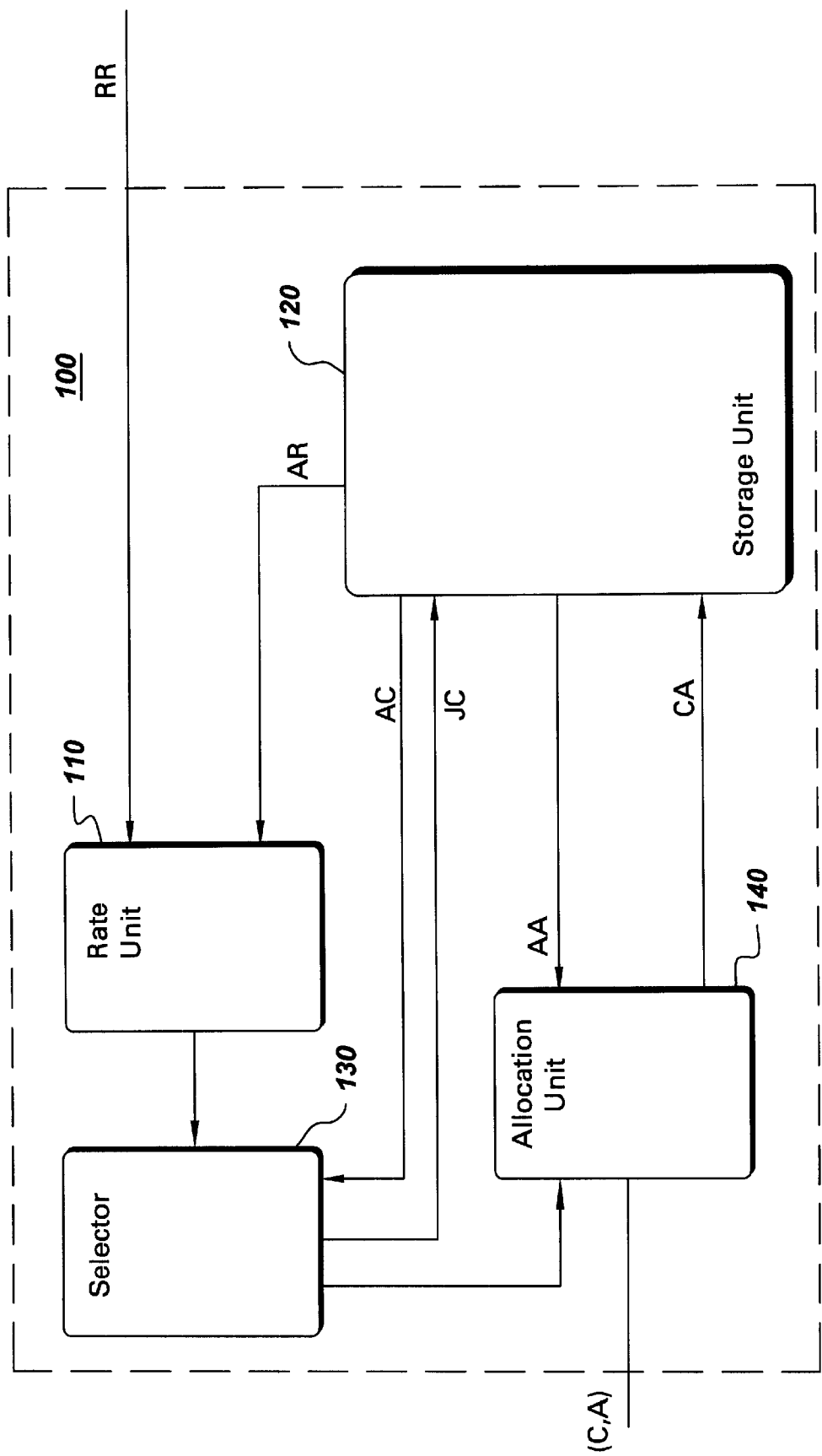
FIG. 6 is a block diagram of an inbound circuit manager providing carrier, user channel, and signaling alphabet assignments in accordance with the present invention.

FIG. 6 is a block diagram of an inbound circuit manager (ICM) 100 included in gateway server 2 (FIG. 1) and providing carrier, user channel, and signaling alphabet assignments. For example, gateway server 2 receives from user station 4-1 (FIG. 1) an access request that includes a requested transfer rate. ICM 100 responds to a signal indicating the requested rate by identifying a frequency carrier with a user channel having available transfer capacity at the requested transfer rate, assigning the available user channel and carrier to user station 4-1 and allocating transfer capacity from the carrier to accommodate the access request.

ICM 100 includes a rate unit 110, a storage unit 120, a selector 130, and an allocation unit 140. Rate unit 110 receives a signal RR indicating a requested rate value for a requested transfer rate, specified in the access request received from user station 4-1.

In a Ka-band satellite embodiment, a user station typically will send access requests to satellite 8 (FIG. 2) on a random access request channel. Each access request alerts satellite 8 that the requesting station desires a carrier allocation and at least indicates a desired transfer rate. Optionally, the access request indicates plural, prioritized choices of desired transfer rates and may also indicate an expected transfer time during which the allocated carrier will be used by the user station.

After gateway server 2 identifies a frequency carrier having available transfer capacity in a user channel at the requested transfer rate, it assigns to user station 4-1 (FIG. 1) an available signaling alphabet for that user channel. Each of the offered transfer rates corresponds to a set of signaling alphabets designed to provide spread spectrum coding for data transfer at the offered rate.

For a given user channel, a lower offered transfer rate permits a larger set of signaling alphabets than a higher transfer rate. In turn, more signaling alphabets corresponding to the assigned transfer rate allow shared access to the user channel by more users. That is, when the assigned transfer rate for a user channel is lower, the user channel will have a correspondingly larger set of signaling alphabets and a correspondingly larger user capacity.

Rate unit 110 compares the requested rate value to rate values of user channels currently having assigned transfer rates. Rate unit 110 receives these assigned rate values from an allocation table.

In storage unit 120 through a signal AR. When the assigned rate value for a given user channel matches the requested rate value, rate unit 110 signals the match to selector 130. Storage unit 120 sends to selector 130 a signal AC providing identifiers of those user channels having available capacity, i.e., having signaling alphabets not currently assigned to other users.

Selector 130 compares an identifier for the user channel indicated by rate unit 110 with the identifiers received in signal AC. If a match occurs, signifying that the indicated user channel has available transfer capacity, selector 130 selects this user channel and indicates this selection to allocation unit 140 through a signal MC. Allocation unit 140 then updates the allocation table of storage unit 120 through a signal CA to allocate the selected user channel to the access request.

The selected user channel, now assigned to the access request, was identified in signal AC as an available user channel and thus has an unused signaling alphabet available to be assigned to the access request. Allocation unit 140 allocates the unused alphabet to the access request by updating the allocation table to reflect that the alphabet has been assigned. Storage unit 120 identifies the assigned signaling alphabet to allocation unit 140 through a signal AA. Allocation unit 140 then generates a control signal (C,A) identifying the assigned carrier, user channel, and alphabet, for transmission to the requesting user station 4-1.

If rate unit 110 determines that the requested rate does not match any of the currently assigned rates, it sends a no-match signal to selector 130. Also, storage unit 120 provides a no-match signal if no user channels with assigned transfer rates have unused signaling alphabets. In response to either of these no-match signals, selector 130 interrogates the allocation table of storage unit 120 through a signal IC to determine whether any user channels are currently idle, that is, without an assigned transfer rate.

If a specified user channel is currently idle and is currently assigned to no access requests, storage unit 120 sends signal AC to identify the idle user channel. Selector 130 then selects the idle user channel, as identified in signal AC, and indicates this selection to allocation unit 140 through signal MC. In response to selection of the idle user channel, allocation unit 140 assigns the requested transfer rate to the idle user channel. In a preferred embodiment, this transfer rate assignment also provides a set of signaling alphabets corresponding to the transfer rate and the m-sequence phase assigned to the selected user channel.

Allocation unit 140 then allocates the selected user channel to the access request, because the selected user channel now has the requested rate as its assigned rate. Allocation unit 140 also allocates an unused signaling alphabet from among the set of signaling alphabets provided with the transfer rate assignment.

Allocation unit 140 can assign the requested transfer rate to an idle user channel, provided the requested transfer rate is an offered transfer rate. If the requested transfer rate is not an offered transfer rate, an error signal is generated. Alternatively, even if the requested transfer rate is an offered transfer rate, allocation unit 140 uses a set of priority rules to determine whether and when to assign the requested transfer rate to an idle user channel.

In a preferred embodiment, the invention includes a robust synchronization function provided by an Overlay Reference Channel (ORC). The ORC modulates a wideband, very low power satellite-to-CPE outbound downlink signal (the "beacon"). The ORC is thus a very low power spread-spectrum signal, with spectral density well below the power spectral densities of traffic signals, overlaid upon the beacon signal.

The ORC has a chip rate (i.e., signaling rate) preferably at least equal to the chip rate of the spread spectrum data signals from user stations 4. More preferably, the ORC has a chip rate approximately twice the chip rate of data transmissions over carriers 30-1–30-n (FIG. 5). For an exemplary Ka-band satellite embodiment as specified above, in which the user stations or CPEs communicate at 24.192 megachips per second, the preferable ORC chip rate is approximately 48.384 megachips per second. This preferred chip rate ratio provides half-chip resolution.

The ORC provides a time and frequency beacon and benchmark. Each user station, such as user station 4-1 (FIG. 2), for example, acquires the center frequency of the ORC and uses this frequency to synthesize its spread spectrum transmission to satellite 8. In an optional configuration, the user stations also use the acquired center frequency in their frequency synthesis chains for the random access request channel.

User station 4-1 can also use the epoch, i.e., a crosscorrelation peak, of the ORC's pseudorandom generator as a time marker. For example, where the ORC uses an m-sequence of period length 127 and runs at 48.768 megachips per second, the ORC will cycle in the same time as the time of a basic symbol on a 384 kbps user channel, that is, the time to signal a single bit of baseband data at the 384 kbps rate (i.e., 2.6 microseconds).

Figure 7:
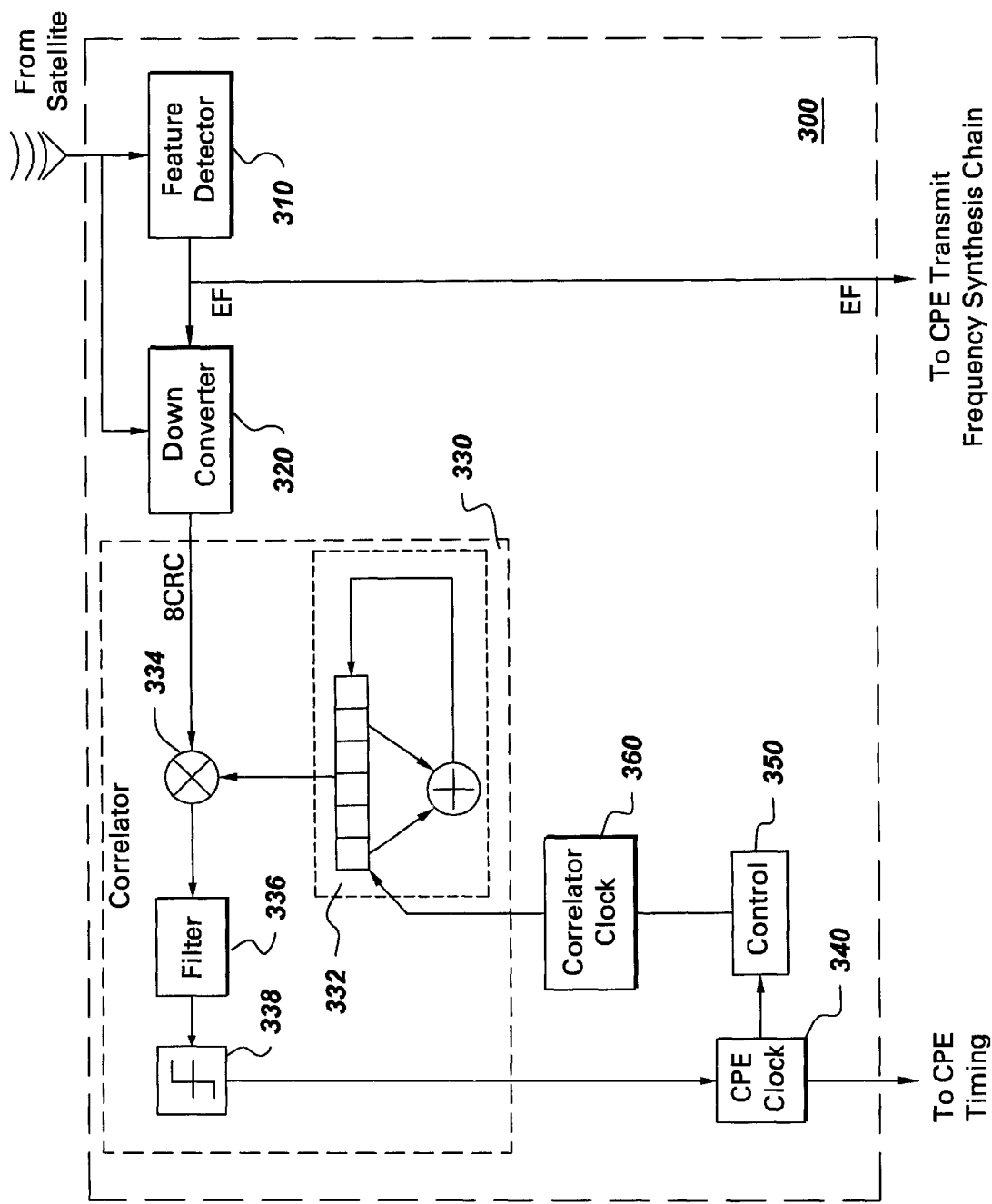
FIG. 7 is a block diagram of a time and frequency recovery module optionally included in the system of FIG. 1 or FIG. 2.

FIG. 7 illustrates a time and frequency recovery (TFR) module 300 included in each of user stations 4-1–4-n of the system of FIG. 2. TFR module 300 includes a feature detector 310, a down converter 320, a correlator 330, a high speed CPE clock 340, a control unit 350, and a correlator clock 360.

Feature detector 310 is a frequency detector, such as a squaring loop, that estimates the received center frequency of the ORC. A signal EF passes the estimated center frequency value to down converter 320 and to other parts (not shown) of the CPE modem. These other parts use the estimated frequency as a driver in synthesizing the data transfer signal to satellite 8 (FIG. 2). Down converter 320 uses the received center frequency to recover, from the received ORC signal, the baseband ORC signal BORC.

In a preferred embodiment, correlator 330 is configured as a sliding correlator including an m-sequence generator 332, a multiplier 334, a filter 336, and a peak detector 338. Generator 332 produces a local version of the ORC digit stream (or ORC baseband signal), which multiplier 334 applies against the incoming signal BORC. Filter 336 shapes the integrated signal for peak detector 338. A crosscorrelation peak in the filtered signal is marked by peak detector 338, which sends a synchronizing pulse to CPE clock 340.

CPE clock 340 continuously stabilizes the period of the crosscorrelation peak through a feedback loop including control unit 350 and correlator clock 360. The timing signal from CPE clock 340 is also reported out to other parts of the CPE modem (not shown), which use it to frame the bauds for the uplink inbound signaling.

In a preferred embodiment, every eighth period of the ORC baseband cycle is inverted. This inversion provides a start-of-baud marker that facilitates synthesis of the data transfer signaling of the user station at transfer rates below the maximum rate, e.g., below 384 kbps. Thus the every-eighth-period inversion of the ORC periodic cycle is also recovered and reported to other parts (not shown) of the user station.

User station 4-1 (FIG. 2) thus finds an epoch with correlator 330 and uses a high speed CPE clock 340 to count ORC chip times from the epoch. Once CPE clock 340 is synchronized, user station 4-1 can use it for approximate alignment of the m-sequence phase assigned to the user station.

FIG. 8 is a timing diagram of the ORC channel timer compared with chips composing a CPE signaling baud (spread signaling data transfer) bit. The chip rate shown in FIG. 8 is nominally twice the chip rate of the data transfer signal.

At satellite 8 (FIG. 2), the individual CPE uplink transmissions are each demodulated and the baseband signals multiplexed onto a wideband downlink signal. Gateway server 2 (FIG. 1) manages the individual CPE transmissions for efficient utilization of carrier capacity through ICM 100 (FIG. 6). Satellite 8 must therefore provide onboard processing for beacon synthesis, access request reception, and user channel/signaling alphabet assignment.

The Ka-band satellite embodiment also preferably includes processing to adjust the beacon center frequency and ORC synchronization to compensate for the velocity of satellite 8 and its distance relative to user stations 4-1-4-n (FIG. 2). Nominally, a geostationary satellite is modeled as a stationary body positioned above the equator, having a nominal orbital period equal to the Earth's sidereal day, approximately 23 hours, 56 minutes, 4.1 seconds. This relationship corresponds to a distance of 42,164.2 kilometers (km) from Earth's center to satellite 8 and an orbital velocity of 3.075 km per second.

Orbital perturbations may significantly affect demodulators and multiplexers. A. S. Gupta, "A Program to Compute the Coordinates of a Geostationary Satellite for Time and Frequency Broadcast," *IEEE Trans. Instrumentation & Measurement*, v. 2 (2) (April 1993), pp. 480–89, indicates the following sources and relative magnitudes of significant perturbing forces: (1) the nonspherical part of the Earth's geopotential ($10^{-6}$ m/sec$^2$); (2) attractions from sun, moon ($10^{-5}$ m/sec2) and other planets (10–9/sec$^2$); (3) Solar radiation pressure ($10^{-7}$ m/sec$^2$); (4) force due to solar corpuscular wind ($10^{-10}$ m/sec$^2$); (5) coriolis force due to precession of the mean equatorial geocentric system of date ($10^{-8}$ m/sec$^2$); (6) forces of reaction to orbit maneuvers such as station keeping ($10^{-3}$ m/sec$^2$; (7) forces due to satellite altitude control maneuvers ($10^{-10}$ m/sec$^2$).

The sun/moon forces (2) cause the most pronounced natural perturbations and it is helpful to gauge their magnitude. V. J. Slabinkski, "Variation in Range, Range-Rate, Propagation Time Delay, and Doppler Shift for a Nearly Geostationary Satellite," in *Communications Satellite Technology* (1974) at pp. 3–28, states that "the gravitational pull of the sun and moon cause sinusoidal oscillations in the satellites geocentric radial distance with ≈12 hr periods and amplitudes of ≈0.29 km and ≈0.63 km, respectively. These oscillations are in phase at the times of new and full moon. At such times these perturbations give variations with amplitudes of ≈0.9 km in the range and ≈6 microseconds in the total time delay, and contribute ≈12 hr variations with amplitudes ≈0.13 m/sec to the range rate and 26 0.9·10$^{-9}$ to the fractional Doppler shift of a signal sent through the satellite."

FIG. 9 shows an uplink inbound receiver 400 included in satellite 8 to simultaneously provide beacon control, capacity allocation, and orbital perturbation compensation. Receiver 400 includes ICM 100 which, as described above, performs capacity allocation. Also included are a beacon generator 410, a satellite clock 420, a geometry calculator 430, and a circuit request receiver/demodulator 440.

Satellite 8 communicates with an Earth-based Network Operations Center (NOC) 450, which provides continuous and precise updating of the position and velocity of satellite 8. Beacon generator 410 adjusts the beacon center frequency in accordance with the component of velocity toward the center of a particular spot beam's footprint. This adjustment de-Dopplers the ORC as received by a user station at the footprint center.

When a user station, such as user station 4-1 (FIG. 2), sends an access request, geometry calculator 430 retrieves the Earth coordinates of the user station from the allocation table in storage unit 120 (FIG. 6) of ICM 100. These coordinates, along with satellite position data provided by NOC 450, enable geometry calculator 430 to compute the distance from satellite 8 to user station 4-1. Geometry calculator 430 also computes the appropriate phase of the ORC that user station 4-1 should use to synchronize (or frame) its data transfer signal.

Circuit request receiver/demodulator 440 receives the access request signal generated by user station 4-1. As described above, ICM 100 determines whether satellite 8 has available capacity when an access request is received and allocates a user channel and signaling alphabet in accordance with currently assigned signaling rates. ICM 100 then provides the allocation instructions, the framing data provided by geometry calculator 430, and any transmission power adjustment instructions to user station 4-1. ICM 100 also notifies network hub 6 (FIG. 2), over a downlink channel, of the access allocation.

Figure 10:
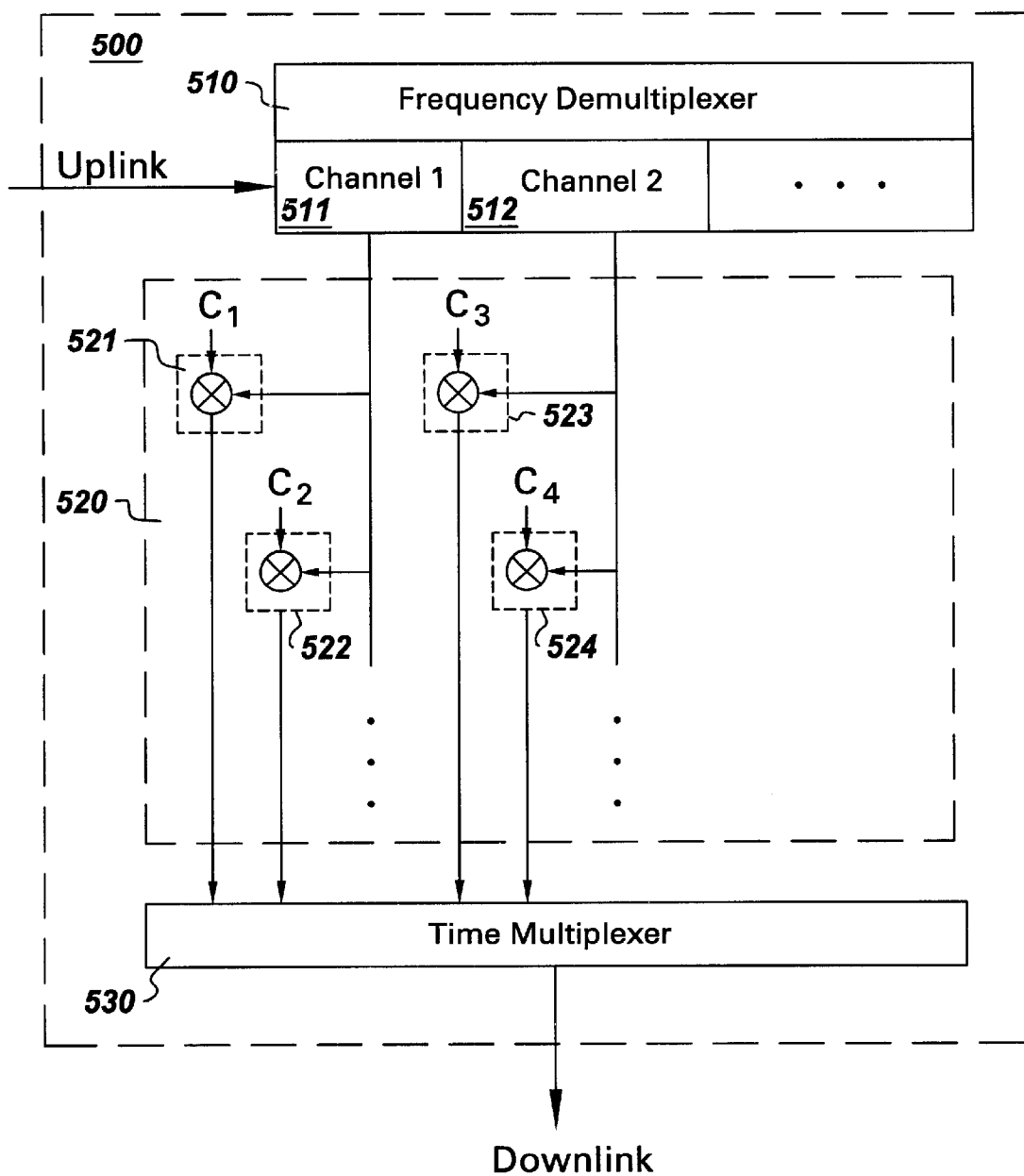
FIG. 10 is a block diagram of an uplink signal processor provided in the satellite of FIG. 2.

FIG. 10 shows an uplink signal processor 500 provided in satellite 8 (FIG. 2) for uplink demodulation and downlink multiplexing. Processor 500 includes a frequency demultiplexer 510, a demodulator bank 520, and a time multiplexer 530. Demultiplexer 510 includes, for example, a bank of separate receivers 511, 512, and so forth, that demultiplex the separate carriers 30-1-30-n (FIG. 5) from the wideband uplinks 5-1-5-n from the user stations in the spot beam. In an alternative arrangement, demultiplexer 510 includes a signal transform processor such as a fast Fourier transform (FFT) processor.

Demodulator bank 520 includes quadrature multipliers 521, 522, 523, 524, and so forth, that quadrature demodulate the individual CPE baseband signals from their respective spread spectrum carriers. For example, multiplier 521 demodulates the baseband signal from user station 4-1 (FIG. 2) by multiplying the demultiplexed carrier against a spreading code C, provided by the signaling alphabet assigned to user station 4-1. The autocorrelation property of the different user channels of the assigned carrier and the different signaling alphabets of the assigned user channel ensures that this multiplication process will extract the baseband signal from the spread spectrum signal with good signal-to-noise ratio. Multiplexer 530 receives the demodulated baseband signals and multiplexes them onto a wideband downlink 7 for transmission to network hub 6 (FIG. 2).

Figure 11:
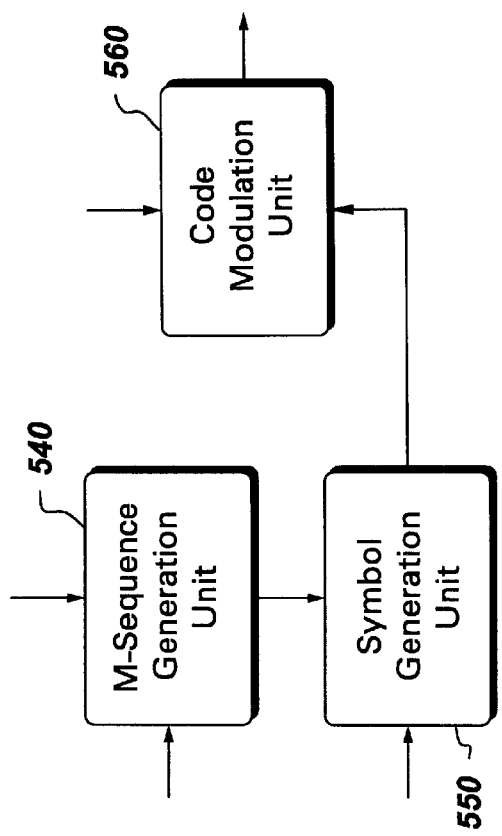
FIG. 11 is a block diagram of a spread spectrum communications apparatus constructed in accordance with the principles of the present invention.

FIG. 11 shows a general arrangement for generating the spreading codes $C_1$, $C_2$, and so forth, as applied in either demodulator bank 520 (FIG. 10) or in a corresponding modulator of a user station. An m-sequence generation unit 540 receives a phase assignment signal corresponding to a given user station, for example, user station 4-1. The phase assignment signal indicates an assigned phase of the m-sequence, the assigned phase defining the user channel assigned to the access request of user station 4-1. M-sequence generation unit 540 generates a sequence signal that represents the assigned phase.

A symbol generation unit 550 receives the sequence signal and an alphabet assignment signal that indicates the signaling alphabet assigned to the access request of user station 4-1. Symbol generation unit 550 generates a coding signal representing the basic symbol of the assigned signaling alphabet. A code modulation unit 560 then applies the coding signal to an incoming first signal to generate an outgoing second signal.

In the context of demodulating a spread spectrum carrier at demodulator bank 520 (FIG. 10), such as carrier 30-1 assigned to user station 4-1, code modulation unit 560 comprises multiplier 521 (FIG. 10). Multiplier 521 multiplies the spread spectrum communications signal provided by the demultiplexed carrier 30-1 assigned to the access request of user station 4-1. Multiplier 521 thereby generates an outgoing signal that is a de-spread, data-modulated signal representing the data transferred from user station 4-1.

Figure 12:
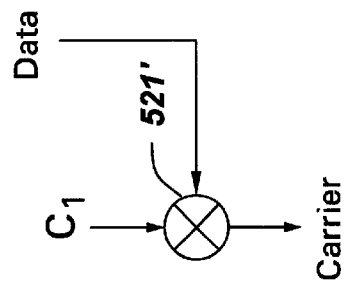
FIG. 12 is a block diagram of circuitry to realize a modulator with the apparatus of FIG. 11.

FIG. 12 shows a structure used by the modem portion of user station 4-1 to modulate carrier 30-1. The coding signal is generated as in FIG. 11 and supplied to multiplier 521', which multiplies the coding signal and a data-modulated signal to generate a spread spectrum communications signal. Multiplier 521' thus serves as a DSSS modulator. In the DSSS embodiment of the invention, therefore, code modulation unit 560 (FIG. 11) comprises either multiplier 521 (FIG. 10) or multiplier 521' (FIG. 12), depending on whether the unit is performing modulation or demodulation. In either case, code modulation unit 560 generates an outgoing signal by applying the coding signal to an incoming signal.

Figure 13:
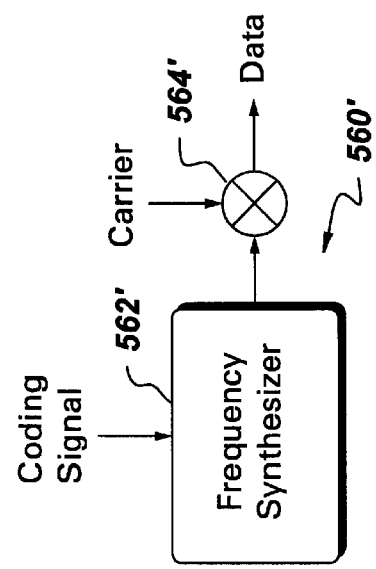
FIG. 13 is a block diagram of circuitry to realize a demodulator with the apparatus of FIG. 11.

In a frequency hopping embodiment of the present invention, code modulation unit 560 also performs frequency synthesis. FIG. 13 shows a code modulation unit 560' for demodulation of a spread spectrum carrier such as carrier 30-1. Here the carrier has been FH-modulated in accordance with a coding sequence such as provided by the structure of FIG. 11. Code modulation unit 560' applies the coding signal to carrier 30-1 through frequency synthesizer 562' and multiplier 564'. Frequency synthesizer 562' generates a hopping signal in accordance with the coding signal, and multiplier 564' despreads carrier 30-1 in accordance with the hopping signal.

Figure 14:
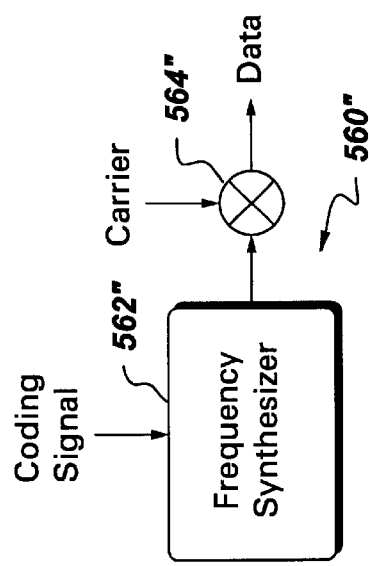
FIG. 14 is a block diagram of an alternative arrangement to realize a modulator with the apparatus of FIG. 11.

FIG. 14 shows a code modulation unit 560" of a modulator in a frequency hopping embodiment of user station 4-1.

A frequency synthesizer 562" receives the coding signal and generates therefrom a hopping signal. A multiplier 564" modulates the data-modulated signal onto carrier 30-1 in accordance with the hopping signal.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A spread spectrum communications apparatus, comprising:

an m-sequence generation unit for receiving a phase assignment signal indicative of an assigned phase of a predetermined m-sequence and for generating a sequence signal representing the assigned phase of the m-sequence;

a symbol generation unit for generating, in accordance with the sequence signal, a coding signal representing a basic symbol of an assigned signaling alphabet, the assigned signaling alphabet being selected from a predetermined number of signaling alphabets comprising respective basic symbols constructed from the assigned phase, having low cross-correlation therebetween, and providing spread spectrum data transfer at an assigned transfer rate selected from a plurality of offered transfer rates; and a code modulation unit for applying the coding signal to an incoming first signal to generate an outgoing second signal.

2. The apparatus of claim 1, wherein:

said communications apparatus comprises a user station in a spread-spectrum communications system;

said code modulation unit comprises a spread-spectrum modulator;

the first signal comprises a data-modulated signal representing data to be transferred to a receiving station of the communications system; and the second signal comprises a spread-spectrum communications signal having a predetermined chip rate and transferring the data at the assigned transfer rate.

3. The apparatus of claim 2, further comprising:

a feature detector for receiving an overlay reference channel and generating therefrom an estimate of a center frequency thereof, the overlay reference channel being a spread spectrum signal representing a pseudorandom reference sequence;

a down converter for receiving the estimate and, in accordance therewith, recovering a received reference signal representing the pseudorandom reference sequence;

a correlator for generating a local reference signal representing the pseudorandom reference sequence and synchronizing the local reference signal with the received reference signal to generate a periodic cross-correlation peak; and a user station clock for stabilizing a period of the periodic cross-correlation peak.

4. The apparatus of claim 2, wherein:

said apparatus generates an access request signal and receives a user station control signal in response thereto;

the access request signal includes an access request requesting access to the communications system for data transfer and a requested transfer rate;

the user station control signal includes the phase assignment signal and the alphabet assignment signal; and the assigned transfer rate coincides with the requested transfer rate.

5. The apparatus of claim 2, wherein the spread-spectrum communications signal is modulated in an unguided communications medium;

said communications apparatus comprises a ground-based user station of the communications system; and the receiving station comprises a gateway server disposed on a satellite in Earth orbit, for transmitting the user station control signal to said communications apparatus.

6. The apparatus of claim 5, wherein the unguided communications medium comprises a Ka-band microwave spectrum segment.

7. The apparatus of claim 2, wherein said code modulation unit includes a multiplier for generating the spread spectrum communications signal by direct sequence spread spectrum modulation of an assigned frequency carrier in accordance with the coding signal and the data-modulated signal.

8. The apparatus of claim 2, wherein said code modulation unit includes a frequency synthesizer for generating the spread spectrum communications signal by frequency hopping spread spectrum modulation of an assigned frequency carrier in accordance with the coding signal and the data-modulated signal.

9. The apparatus of claim 1, wherein:

said communications apparatus comprises a gateway server for a spread-spectrum communications system; and said code modulation unit comprises a spread-spectrum modulator;

the first signal being a spread-spectrum communications signal having a predetermined chip rate and adapted to transfer data at the assigned transfer rate from a transmitting station of the communications system; and the second signal being a de-spread, data-modulated signal representing the data.

10. The apparatus of claim 9, wherein said communications apparatus is adapted to receive an access request signal from a user station of the communications system and to generate a user station control signal in response thereto, the access request signal indicating a first request for access to the communications system for data transfer and a requested transfer rate.

11. The apparatus of claim 10, further comprising an inbound circuit manager that includes:

a rate unit for comparing the requested transfer rate with the assigned transfer rate;

a selector for selecting for the first access request, a first user channel corresponding to the assigned phase as an available user channel when the first user channel and the assigned signalling alphabet are not both allocated to another access request and the rate unit determines that the assigned transfer rate coincides with the requested transfer rate; and an allocation unit for allocating to the first access request the assigned signaling alphabet, the available user channel as an assigned user channel, and a carrier including the available user channel as an assigned carrier when the available user channel has been selected for the first access request.

12. The apparatus of claim 9, wherein the spread-spectrum communications signal is modulated in an unguided communications medium and said gateway server is disposed in a satellite in an Earth orbit.

13. The apparatus of claim 12, wherein the unguided communications medium comprises a Ka-band microwave spectrum segment.

14. The apparatus of claim 12, further comprising a beacon generator for providing a beacon signal to a user station of the communications system and for adjusting a center frequency of the beacon signal in accordance with a velocity signal indicating velocity of the satellite with respect to the user station, the beacon signal providing an overlay reference channel for transmitting at a reference chip rate.

15. The apparatus of claim 9, further comprising a demultiplexer for frequency-demultiplexing an assigned carrier from a wideband inbound signal, the assigned carrier including the spread-spectrum communications signal.

16. The apparatus of claim 12, further comprising a geometry calculator for receiving an identification signal and a satellite position signal and for calculating, in accordance therewith, distance from the satellite to a user station of the commmunications system, the identification signal identifying the user station.

17. The apparatus of claim 9, wherein said code modulation unit includes a multiplier for generating the data-modulated signal by direct sequence spread spectrum modulation of the spread spectrum communications signal in accordance with the coding signal.

18. The apparatus of claim 9, wherein said code modulation unit includes a frequency synthesizer and is adapted to generate the data-modulated signal by frequency hopping spread spectrum modulation of the spread spectrum communications signal in accordance with the coding signal.

19. A spread spectrum communications system comprising first and second spread spectrum communications apparatuses, each of said apparatuses including:

an m-sequence generation unit for receiving a phase assignment signal indicative of an assigned phase of a predetermined m-sequence and for generating a sequence signal representing the assigned phase of the m-sequence;

a symbol generation unit for receiving the sequence signal and an alphabet assignment signal indicative of an assigned signaling alphabet and for generating a coding signal representing a basic symbol of the assigned signaling alphabet, the basic symbol being constructed from the assigned phase and the assigned signaling alphabet being one of a predetermined number of signaling alphabets having low cross-correlation therebetween and providing spread spectrum modulation for data transfer at an assigned transfer rate corresponding to the predetermined number and selected from a plurality of offered transfer rates; and a code modulation unit for applying the coding signal to an incoming first signal of the communications apparatus to generate an outgoing second signal of the communications apparatus.

20. The communications system of claim 19, wherein:

the first communications apparatus comprises a user station and the code modulation unit thereof comprises a spread-spectrum modulator;

the incoming first signal of the first communications apparatus comprises a first data-modulated signal representing data to be transferred to the second communications apparatus;

the second signal of the first communications apparatus comprises a spread-spectrum communications signal having a predetermined chip rate and adapted to transfer the data at the assigned transfer rate;

the second communications apparatus comprises a gateway server and the code modulation unit thereof comprises a spread-spectrum modulator;

the incoming first signal of the second communications apparatus comprises the spread-spectrum communications signal; and the outgoing second signal of the second communications apparatus comprises a de-spread, second data-modulated signal representing the data.

21. A method of spread spectrum communication, comprising the steps of:

generating a sequence signal representing an assigned phase of a predetermined m-sequence;

generating, in accordance with the sequence signal, a coding signal representing a basic symbol of an assigned signaling alphabet, the assigned signaling alphabet being selected from a predetermined number of signaling alphabets comprising respective basic symbols constructed from the assigned phase, having low cross-correlation therebetween, and adapted to provide spread spectrum data transfer at an assigned transfer rate selected from a plurality of offered transfer rates; and generating an outgoing signal in accordance with the coding signal and an incoming signal.

22. The method of claim 21, wherein the outgoing signal comprises a spread spectrum communications signal, the incoming signal comprises a data-modulated signal, and the step of generating the outgoing signal comprises modulating the data-modulated signal onto an assigned carrier.

23. The method of claim 22, wherein the assigned carrier is transmitted in an unguided communications medium.

24. The method of claim 22, further comprising the steps of:

estimating a center frequency of an overlay reference channel representing a pseudorandom reference sequence;

recovering from the overlay reference channel, in accordance with the estimated center frequency thereof, a received reference signal representing the pseudorandom reference sequence;

generating a local reference signal representing the pseudorandom reference sequence;

synchronizing the local reference signal with the received reference signal to generate a periodic cross-correlation peak;

stabilizing a period of the periodic cross-correlation peak; and synchronizing the spread spectrum communications signal in accordance with the periodic cross-correlation peak.

25. The method of claim 22, further comprising the steps of:

generating an access request signal indicating an access request including a requested transfer rate for spread spectrum data transfer; and generating, in response to the access request signal, a user station control signal indicating the assigned phase and the assigned signaling alphabet when the assigned transfer rate coincides with the requested transfer rate.

26. The method of claim 22, wherein the asssigned carrier is transmitted in a Ka-band microwave spectrum segment.

27. The method of claim 22, wherein the step of generating the outgoing signal comprises generating the spread spectrum communications signal by direct sequence spread spectrum modulation of the assigned carrier in accordance with the coding signal and the data-modulated signal.

28. The method of claim 22, wherein the step of generating the outgoing signal comprises generating the spread spectrum communications signal by frequency hopping spread spectrum modulation of the assigned carrier in accordance with the coding signal and the data-modulated signal.

29. The method of claim 21, wherein the incoming signal comprises a spread spectrum communications signal, the outgoing signal comprises a data-modulated signal, and the step of generating the outgoing signal comprises modulating the data-modulated signal from the spread spectrum communications signal in accordance with the coding signal.

30. The method of claim 29, further comprising the steps of:

receiving an access request signal indicative of a first access request including a requested transfer rate;

comparing the assigned transfer rate with the requested transfer rate;

selecting for the first access request a first user channel corresponding to the assigned phase and constituting an available user channel when the first user channel and the assigned signaling alphabet are not both allocated to another access request and the assigned transfer rate coincides with the requested transfer rate, the first user channel being included in an assigned carrier; and allocating to the first access request the assigned signaling alphabet, the available user channel as an assigned user channel, and the assigned carrier when the available user channel has been selected for the first access request.

31. The method of claim 29, wherein the step of generating the outgoing signal comprises generating the data-modulated signal by direct sequence spread spectrum modulation of the spread spectrum communications signal in accordance with the coding signal.

32. The method of claim 29, wherein the step of generating the outgoing signal comprises generating the data-modulated signal by frequency hopping spread spectrum modulation of the spread spectrum communications signal in accordance with the coding signal.

33. The method of claim 29, further comprising the steps of:

generating a beacon signal from a satellite in Earth orbit to a user station, the beacon signal including an overlay reference channel transmitted at a reference chip rate; and adjusting center frequency of the beacon signal in accordance with a velocity signal indicative of the satellite velocity with respect to the user station.

34. The method of claim 33, further comprising the steps of:

receiving an identification signal identifying the user station and a satellite position signal indicating position of the satellite; and calculating, in accordance with the identification signal and the satellite position signal, distance from the satellite to the user station.

35. A computer-readable program for controlling a computer to provide spread spectrum communications by performing the steps of:

generating a sequence signal representing an assigned phase of a predetermined m-sequence;

generating, in accordance with the sequence signal, a coding signal representing a basic symbol of an assigned signaling alphabet, the assigned signaling alphabet being selected from a predetermined number of signaling alphabets comprising respective basic symbols constructed from the assigned phase, having low cross-correlation therebetween, and adapted to provide spread spectrum data transfer at an assigned transfer rate selected from a plurality of offered transfer rates; and generating an outgoing signal in accordance with the coding signal and an incoming signal.

36. The computer-readable program of claim 35, wherein the incoming signal comprises a spread spectrum communications signal, the outgoing signal comprises a data-modulated signal, and the step of generating the outgoing signal comprises modulating the data-modulated signal from the spread spectrum communications signal in accordance with the coding signal, said program further comprising the steps of:

receiving an access request signal indicative of a first access request including a requested transfer rate;

comparing the assigned transfer rate with the requested transfer rate;

selecting for the first access request a first user channel corresponding to the assigned phase and constituting an available user channel when the first user channel and the assigned signaling alphabet are not both allocated to another access request and the assigned transfer rate coincides with the requested transfer rate, the first user channel being included in an assigned carrier; and allocating to the first access request the assigned signaling alphabet, the available user channel as an assigned user channel, and the assigned carrier when the available user channel has been selected for the first access request.

\* \* \* \* \*